(12) United States Patent
Gilreath et al.

(10) Patent No.: US 9,641,287 B2
(45) Date of Patent: May 2, 2017

(54) METHODS AND APPARATUS FOR HIGH-INTEGRITY DATA TRANSFER WITH PREEMPTIVE BLOCKING

(71) Applicant: HONEYWELL INTERNATIONAL INC., Morristown, NJ (US)

(72) Inventors: Jon Douglas Gilreath, Peoria, AZ (US); Thom Kreider, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 151 days.

(21) Appl. No.: 14/595,731

(22) Filed: Jan. 13, 2015

(65) Prior Publication Data

US 2016/0203042 A1 Jul. 14, 2016

(51) Int. Cl.
*G06F 11/10* (2006.01)
*H04L 1/00* (2006.01)

(52) U.S. Cl.
CPC .......... *H04L 1/0045* (2013.01); *H04L 1/0061* (2013.01)

(58) Field of Classification Search
CPC .................................................... G06F 11/104
USPC ........................................................ 714/807
See application file for complete search history.

(56) References Cited

U.S. PATENT DOCUMENTS

| | | |
|---|---|---|
| 3,350,033 A | 10/1967 | Goldberg |
| 4,453,215 A | 6/1984 | Reid |
| 4,507,782 A | 3/1985 | Kunimasa et al. |
| 5,485,383 A | 1/1996 | Schreiber |
| 5,506,958 A | 4/1996 | Myran |
| 5,950,965 A | 9/1999 | Epstein et al. |
| 6,041,036 A | 3/2000 | Baek et al. |
| 6,289,268 B1 | 9/2001 | Didinsky et al. |
| 6,298,289 B1 | 10/2001 | Lloyd et al. |
| 6,377,352 B1 | 4/2002 | Coronato et al. |
| 6,515,221 B1 | 2/2003 | Varga |
| 6,648,274 B1 | 11/2003 | Bailey et al. |
| 6,679,457 B1 | 1/2004 | Meffe et al. |
| 6,681,159 B2 | 1/2004 | Li et al. |
| 6,681,649 B2 | 1/2004 | Hyde et al. |
| 6,721,658 B2 | 4/2004 | Stadter et al. |
| 6,775,599 B2 | 8/2004 | Meffe et al. |
| 6,779,759 B1 | 8/2004 | Klupar et al. |
| 6,869,048 B2 | 3/2005 | Draisey et al. |
| 6,891,498 B2 | 5/2005 | Jacobs et al. |
| 6,948,110 B2 | 9/2005 | Koishi |
| 6,985,975 B1 | 1/2006 | Chamdani et al. |
| 7,020,724 B2 | 3/2006 | Emerson et al. |
| 7,057,734 B2 | 6/2006 | Jacobs et al. |
| 7,097,140 B2 | 8/2006 | Staley et al. |
| 7,216,036 B2 | 5/2007 | Brady et al. |
| 7,273,196 B2 | 9/2007 | Jacobs |

(Continued)

*Primary Examiner* — Fritz Alphonse
(74) *Attorney, Agent, or Firm* — Lorenz & Kopf, LLP

(57) ABSTRACT

A method for performing high-integrity data transmission is provided. The method obtains a first set of data at a first transmitter and a second set of data at a second transmitter; develops a first key for the obtained first set of data and a second key for the obtained second set of data; and when the first key matches the second key, provides a receiver indication of validity of the first set of data. In certain embodiments, the method stores the first key and the second key within a predetermined window of time. In some embodiments, when the first key matches the second key, the method also synchronizes operation of the first transmitter and the second transmitter.

27 Claims, 4 Drawing Sheets

(56) References Cited

U.S. PATENT DOCUMENTS

| | | |
|---|---|---|
| 7,350,026 B2 | 3/2008 | Popescu et al. |
| 7,407,137 B2 | 8/2008 | Klupar et al. |
| 8,312,782 B2 | 11/2012 | McMickell et al. |
| 8,320,742 B2 * | 11/2012 | Park .................. G06F 21/10 235/380 |
| 8,370,124 B1 | 2/2013 | Gold et al. |
| 9,067,694 B2 | 6/2015 | Liu et al. |
| 9,091,606 B2 | 7/2015 | Fitz-Coy et al. |
| 2002/0109047 A1 | 8/2002 | Draisey et al. |
| 2004/0205228 A1 | 10/2004 | Rose et al. |
| 2006/0149986 A1 | 7/2006 | Mizutani |
| 2007/0029446 A1 | 2/2007 | Mosher et al. |
| 2008/0095373 A1 * | 4/2008 | Nagata .................. H04L 63/10 380/278 |
| 2009/0010169 A1 | 1/2009 | Tamura et al. |
| 2009/0217092 A1 | 8/2009 | Weiberle et al. |
| 2012/0199697 A1 | 8/2012 | Nagabhushan et al. |
| 2013/0199308 A1 | 8/2013 | Fitz-Coy et al. |
| 2015/0074404 A1 * | 3/2015 | Kasper .................. H04L 63/08 713/170 |
| 2015/0088453 A1 | 3/2015 | Lagadec et al. |

* cited by examiner

METHODS AND APPARATUS FOR HIGH-INTEGRITY DATA TRANSFER WITH PREEMPTIVE BLOCKING

TECHNICAL FIELD

Embodiments of the subject matter described herein relate generally to performing high-integrity data transfers. More particularly, embodiments of the subject matter relate to verification of the validity of data prior to data transmission in a computing environment.

BACKGROUND

High integrity systems need to exchange data that is guaranteed to be accurate and valid. In critical applications, the propagation of erroneous data can be hazardous. High integrity systems use different methods to ensure the data exchanged is accurate. These methods include voting schemes such as triple-mode redundancy and command-monitor configurations. However, for all of these implementations, the data is checked as it is transferred, so the detection of an error event occurs after the data has been sent.

Accordingly, it is desirable to modify the data transfer mechanism to address these issues. Furthermore, other desirable features and characteristics will become apparent from the subsequent detailed description and the appended claims, taken in conjunction with the accompanying drawings and the foregoing technical field and background.

BRIEF SUMMARY

Some embodiments of the present invention provide a method for performing high-integrity data transmission. The method obtains a first set of data at a first transmitter and a second set of data at a second transmitter; develops a first key for the obtained first set of data and a second key for the obtained second set of data; and when the first key matches the second key, permits one or more receivers to access at least one of the first set of data and the second set of data. In certain embodiments, the method stores the first key and the second key within a predetermined window of time. In some embodiments, when the first key matches the second key, the method provides a receiver with indication of validity of the first set of data and synchronizes operation of the first transmitter and the second transmitter.

Some embodiments provide a system for preventing error transmission in a computational environment. The system includes a plurality of transmitters, wherein a first one of the plurality of transmitters is configured to communicate a first set of data and a second one of the plurality of transmitters is configured to communicate a second set of data; at least one receiver, configured to obtain data from the plurality of transmitters; and processing logic, configured to: create a first key associated with the first set of data and a second key associated with the second set of data; compare the first key to the second key to determine whether the first key matches the second key; and transmit data retrieval details to the receiver when the first key matches the second key, wherein the data retrieval details facilitate access to the first set of data by the receiver. In certain embodiments, the processing logic is further configured to: determine whether a timing condition has been satisfied, and when the first key matches the second key and the timing condition has been satisfied, to transmit data retrieval details and to synchronize operation of the plurality of transmitters and the at least one receiver.

Some embodiments provide a non-transitory, computer-readable medium containing instructions thereon, which, when executed by a processor, perform a method. The method compares a first key that uniquely characterizes a first set of data to a second key that uniquely characterizes a second set of data; when the first key matches the second key, provides access to the first set of data to a receiver; and when the first key does not match the second key, prevents access to the first set of data by the receiver. In certain embodiments, the method receives at least two keys within a predetermined timeframe, wherein each of the at least two keys uniquely characterizes a respective one of at least two sets of data; compares the at least two keys; and when the at least two keys are identical, provides an indication of availability of one or more of the at least two sets of data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION OF EMBODIMENTS

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for performing high-integrity data transmission in a computing environment. More specifically, performing high-integrity data transmission by modifying the data transfer mechanism so that data is not forwarded to a receiving node until after it has passed integrity checking. This presents the benefit of simplifying downstream error handling and eliminating transient effects resulting from invalid data transfers. Generally, a set of data is produced by more than one element of a computing system, for purposes of determining the accuracy of the data. A first key is created using a first set of the produced data, and a second key is created using a second set of the produced data. The keys are then compared to determine whether the datasets are identical, and therefore valid. When valid, a receiver is permitted access to the data. However, when the data is determined to be invalid, a receiver is prevented from access and/or knowledge of the existence of the data.

Figure 1:
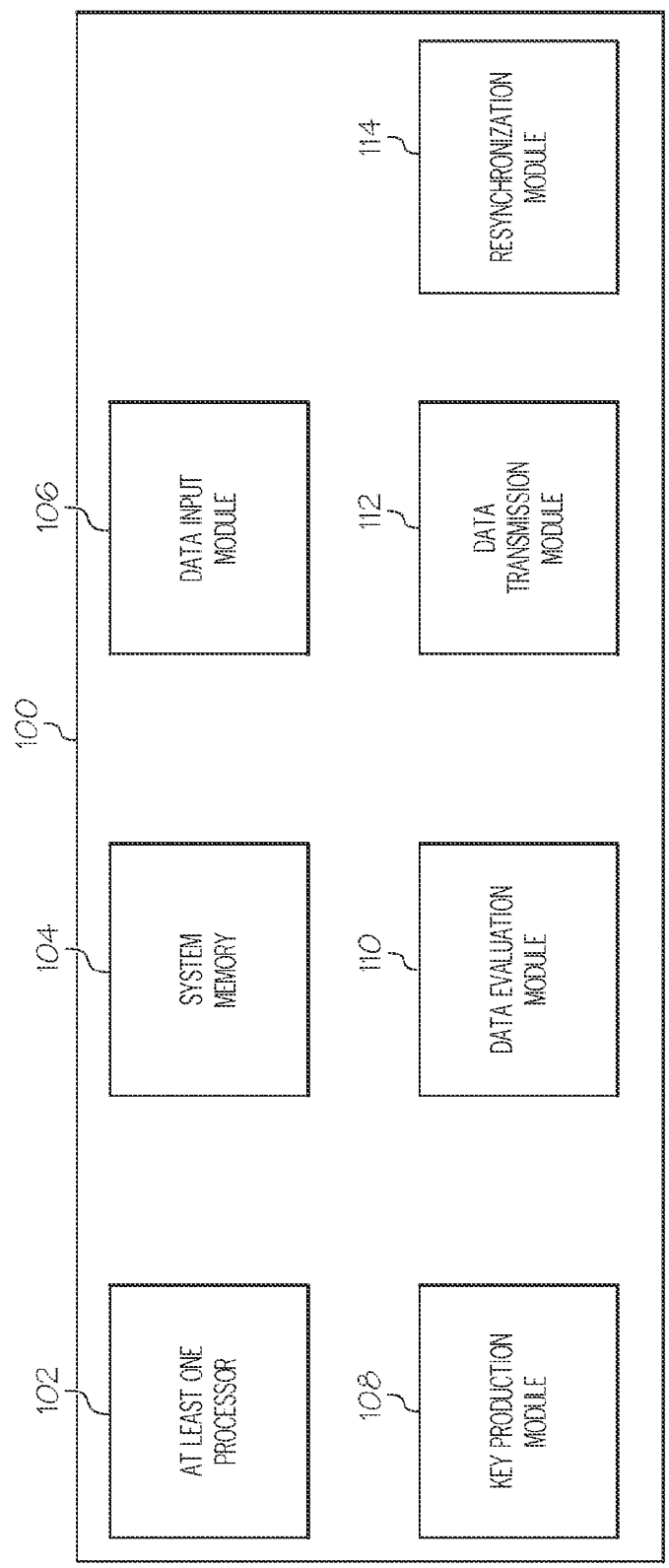
FIG. 1 is a schematic block diagram representation of a high-integrity data transfer system, according to some embodiments.

FIG. 1 is a schematic block diagram representation of a high-integrity data transfer system 100, according to some embodiments. The high-integrity data transfer system 100 may be implemented using any desired platform, but will generally be implemented using one or more computers, processors, embedded systems, or the like, which are used or incorporated into a critical application computing system. Critical applications are generally associated with a high level of danger to life and/or property. Examples of critical application computing systems may include, without limitation, systems used for transportation applications, manufacturing applications, nuclear power applications, water treatment applications, or any type of application for which a high degree of risk may be involved.

The high-integrity data transfer system 100 may include, without limitation: at least one processor 102; a system memory 104; a data input module 106; a key production module 108; a data evaluation module 110; and a data transmission module 112. In practice, various embodiments of the high-integrity data transfer system 100 may include additional or alternative elements and components, as desired for the particular application. These elements and features of the high-integrity data transfer system 100 may be operatively associated with one another, coupled to one another, or otherwise configured to cooperate with one another as needed to support the desired functionality—in particular, performing high-integrity data transfer, as described herein. For ease of illustration and clarity, the various physical, electrical, and logical couplings and interconnections for these elements and features are not depicted in FIG. 1. Moreover, it should be appreciated that embodiments of the high-integrity data transfer system 100 will include other elements, modules, and features that cooperate to support the desired functionality. For simplicity, FIG. 1 only depicts certain elements that relate to the data transfer techniques described in more detail below.

The at least one processor 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems. Alternatively, the at least one processor 102 is not implemented using a microcontroller or processor; in this case, the high-integrity data transfer system 100 utilizes microcontroller and/or processor components relevant to a particular application.

The at least one processor 102 is configured to communicate with system memory 104. The system memory 104 represents any non-transitory short or long term storage or other computer-readable media capable of storing programming instructions for execution on the at least one processor 102, including any sort of random access memory (RAM), read only memory (ROM), flash memory, magnetic or optical mass storage, and/or the like. It should be noted that the system memory 104 represents one suitable implementation of such computer-readable media, and alternatively or additionally, the at least one processor 102 could receive and cooperate with external computer-readable media realized as a portable or mobile component or application platform, e.g., a portable hard drive, a USB flash drive, an optical disc, or the like.

The data input module 106 is configured to cooperate with at least two producers and/or transmitters of a dataset that is in the process of being communicated to one or more elements in the computing system (e.g., consumers and/or receivers). Each transmitter either receives or produces the dataset in question, and is responsible for an initial transmission (if the data is produced by the transmitter) or re-transmission (if the data is simply received by the transmitter) of the data, with the intent of the dataset being received by one or more particular receivers. Here, the data input module 106 is configured to identify the appropriate dataset, and to store the dataset into a short-term location in system memory 104. The action of storing the dataset into system memory 104, rather than allowing the transmitter(s) to forward the dataset directly to the receiver(s), effectively re-routes the data and prevents the one or more receivers from obtaining the data until the high-integrity data transfer system 100 has had the opportunity to evaluate the validity of the data.

The key production module 108 is configured to utilize a dataset received by the data input module 106 to create an identifier specific to that particular dataset. The created identifier may be referred to as a "key". Each key comprises identifying characteristics of an associated set of data. In certain embodiments, identifying characteristics may include: a pointer to a short-term location in system memory 104 at which the set of data has been stored; a pointer to a short-term location in system memory 104 at which a key associated with the set of data has been stored; a size of the set of data; and/or results of a high-integrity data transfer system 100 integrity check, such as a CRC or checksum.

The key production module 108 incorporates two categories of information into a typical key: a primary category for data identity and integrity, and a second category for utility. Because the dataset itself is not incorporated into its associated key, the data identity and integrity information is essentially a proxy for the original data payload. The proxy can be generated by many different techniques, but the goal is to create a unique representation of the original data. Any difference in the original data creates a difference in the proxy data that can be detected. Common data identity and integrity methods include checksums, cyclic-redundancy checks, cryptographic hash codes, Hamming codes, Reed-Solomon codes, Reed-Muller codes, and various data matrix schemes. The utility information provides more generic information about the original data. It may contain information about the data location, size or length of data, or the time the data was produced or processed. The primary purpose of the utility information is to support processing or transfer of the data. However, the utility information does overlap the data identity and integrity information. Differences in location, size, or time processed may also be indicators of invalid/unacceptable data for some embodiments of a high-integrity data transfer system 100. For example, identical data with different time stamps may be considered invalid when the data is used within a time-critical application.

The data evaluation module 110 is configured to determine the accuracy and validity of a given set of data in the high-integrity data transfer system 100. To accomplish this, the data evaluation module 110 determines whether a first dataset, produced or received by a first transmitter, is identical to a second dataset, which has been produced or received by a second transmitter. Here, the data evaluation module 110 compares a key associated with the first dataset to a key associated with the second dataset. If the keys match, or are identical, then the data evaluation module 110 determines that the associated datasets are identical, and therefore, there are no errors present in either set of data. In other words, when the data evaluation module 110 determines that the datasets are identical, the data evaluation module 110 has effectively determined that the generated datasets are valid. The comparison of the keys results in effectively comparing the results of an integrity check, the size of the sets of data, the stored locations of the sets of data, or other included key information.

In certain embodiments, the data evaluation module 110 determines the validity of the key data only. In other embodiments, however, the data evaluation module 110 also compares timing information associated with each key to determine whether an associated dataset contains one or more errors. Timing information may include a time at which a key is stored in a short-term memory location, or in other words, a "time of arrival" of the key at the memory location. The data evaluation module 110 obtains the timing information from a timing source external to the producers/transmitters. The data evaluation module 110 uses the key data (e.g., the contents of each key) to check validity of each associated set of data, and the timing information to validate the timeliness. Here, the data evaluation module 110 evaluates the validity and timeliness to determine whether both producers/transmitters created the same key data and presented the key to the data evaluation module 110 either simultaneously or within a pre-configured time window.

Once the data evaluation module 110 has determined the validity of the sets of data (i.e., that the keys associated with the sets of data are identical), the data transmission module 112 is configured to forward one of the identical keys to the designated receiver (e.g., consumer) of the data. In some embodiments, the data transmission module 112 is configured to forward one of the identical keys to the designated receiver after validity and timeliness have been verified. Forwarding a key associated with a valid and error-free dataset provides the receiver with the stored location of the dataset for retrieval by the receiver, effectively providing an indication of, and details associated with the retrieval of, the verified dataset to the receiver.

The resynchronization module 114 is included in synchronous embodiments of the present invention (as described below in Embodiment 2: Synchronous Implementation). The resynchronization module 114 is suitably configured to provide acknowledgement to the sender (i.e., the producer/transmitter associated with the key) that the key (and consequently, the dataset associated with the key) was accepted as valid as compared to the opposing processor. This acknowledgment acts to allow the producer to continue with its processing, and to synchronize the at least two producers in time so that both are doing the same work at the same time.

In asynchronous embodiments of the high-integrity data transfer system 100, the resynchronization module 114 is not included. Asynchronous embodiments of the high-integrity data transfer system 100 perform operations consistent with preemptive data blocking, wherein the data evaluation module 110 requires matching keys from the one or more producers before the data transmission module 112 forwards data to one or more consumers. Here, the resynchronization module 114 does not impose any time synchronization on the producers, and the set of data associated with each producer remains in a separate storage location (e.g., separate data buffer) until the data evaluation module 110 determines that the other set(s) of data associated with the one or more other producers are identical or "match". In these non-synchronized implementations, each producer is allowed to continue performing tasks and/or write other data into different/unique buffers. The data from each producer could be produced at different times and/or in different order when the high-integrity data transfer system 100 is implemented asynchronously. Only when the key for each unique data buffer has been successfully validated (against the key for the same data buffer from the other producer) will that data buffer be made available to the consumer(s). In this mode, data transfers may occur in a non-deterministic sequence and neither the producers nor consumers need to be synchronized. The preemptive data blocking still functions and only good data is propagated from producer to consumer. In this mode, erroneous or invalid data is not forwarded because at least one of the producers failed to create it or because the keys did not match when the second producer eventually created it.

Synchronous embodiments of the high-integrity data transfer system 100 include the resynchronization module 114, which performs the operations described above. In synchronous embodiments of the high-integrity data transfer system 100, producers and consumers are designed to follow identical deterministic sequences of data transfers. For example, a first producer writes data into a buffer and generates a key. When the first producer writes the key value, the first producer is immediately halted by the resynchronization module 114. The halt may be accomplished by one or more methods, including but not limited to: the assertion of a HALT signal, stopping the master clock, or the like. In practice, the resynchronization module 114 withholds the acknowledgement signal on the hardware bus access that occurs when the key is written, which prevents a first producer from continued operation. When a second producer writes the same value key for its equivalent data buffer, both producers are acknowledged simultaneously and allowed to proceed. This resynchronizes the two or more producers at every data transfer. In certain embodiments, the one or more consumers may also take advantage of a withheld acknowledge scheme to achieve a more precise synchronization. However that is generally unnecessary, as the consumers may be inherently synchronized by receiving the cross-checked data at the same time and in the same order.

In practice, the data input module 106, the key production module 108, the data evaluation module 110, the data transmission module 112, and/or the resynchronization module 114, may be implemented with (or cooperate with) the at least one processor 102 to perform at least some of the functions and operations described in more detail herein. In this regard, the data input module 106, the key production module 108, the data evaluation module 110, the data transmission module 112, and/or the resynchronization module 114, may be realized as suitably written processing logic, application program code, or the like.

Figure 2:
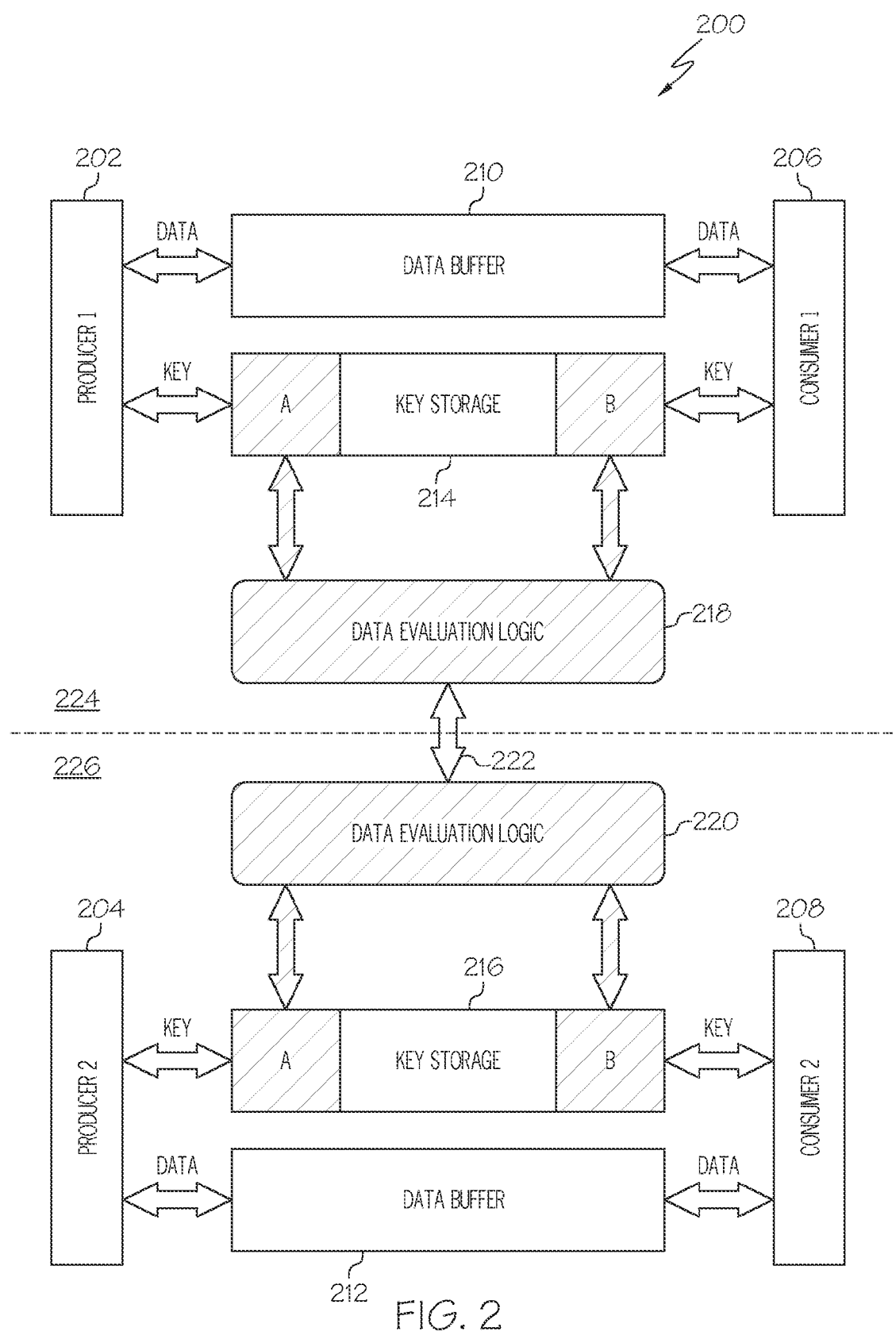
FIG. 2 is a diagram representation of a high-integrity data transfer system, according to some embodiments.

FIG. 2 is a diagram representation of a high-integrity data transfer system 200, according to some embodiments. It should be appreciated that FIG. 2 depicts a simplified embodiment of the high-integrity data transfer system 200, (consistent with the high-integrity data transfer system depicted in FIG. 1) and that a realistic and practical implementation of the high-integrity data transfer system 200 may include additional elements or components. Further, it should be appreciated that producers 202, 204; consumers 206, 208; data buffers 210, 212; and key storage 214, 216;

and any corresponding logical elements, individually or in combination, are exemplary means for performing a claimed function. Performance of the claimed function may require the use of one or more substitute elements or components and/or consolidation of the elements or components, as required for a particular application.

In the embodiment shown, the high-integrity data transfer system 200 includes two producers 202, 204 and two consumers 206, 208. Each producer 202, 204 is paired with a consumer 206, 208, and operates in a particular processing lane 224, 226. Alternative embodiments of a high-integrity data transfer system 200 may include additional producers and/or consumers, as required to accommodate hardware availability or for a particular application. The high-integrity data transfer system 200 further includes memory components, such as data buffers 210, 212 and key storage locations 214, 216. As shown, the first producer 202 stores a first set of data into a short-term memory location (e.g., a data buffer 210), and a first key, associated with the first set of data, into another short-term memory location (e.g., key storage 214). Prior to storing the information, the first producer 202 either receives or creates the first set of data, and then the first producer 202 uses the first set of data to create the first key. The second producer 204 independently follows a similar procedure to create the second key using the received or created second set of data. As described previously with regard to FIG. 1, the first key and the second key may include information including, but not limited to: results of a data integrity check, such as a CRC and/or a checksum; the size of the associated set of data; a pointer to the short-term memory location at which the dataset is stored; and/or a pointer to a short-term location in system memory 104 at which a key associated with the set of data has been stored.

Here, the first set of data and its associated first key remain in the data buffer 210 and key storage 214 until retrieved or replaced. Similarly, the second producer 204 stores a second set of data into data buffer 212 and a second key, which is associated with the second set of data, into key storage 216. The second set of data and the second key also remain in the data buffer 212 and key storage 216 until retrieved or replaced. For purposes of this exemplary embodiment, the first key is created by the first producer 202 and the second key is created by the second producer 204. However, due to the bidirectional nature of the system 200, in other embodiments the consumers 206, 208 may write to the data buffers 210, 212 and initiate a transfer to the producers 202, 204 via the data evaluation logic 218, 220. In this case, each of the consumers 206, 208 act as "producers" or "transmitters", creating and providing the datasets and keys for comparison purposes, and each of the producers 202, 204 act as "consumers" or "receivers".

Data evaluation logic 218, 220 performs a comparison between the two keys to determine whether the first key and the second key are a "match", indicating that the first dataset and the second dataset are identical and, therefore, have not been corrupted by errors. To accomplish this comparison, data evaluation logic 218 accesses the first key (stored in key storage 214) and data evaluation logic 220 accesses the second key (stored in key storage 216). A key exchange 222 occurs between the instances of data evaluation logic 218, 220, wherein each instance of data evaluation logic 218, 220 obtains access to a previously-inaccessible key from the opposing lane. In this embodiment, for example, data evaluation logic 218 provides the first key to data evaluation logic 220, and data evaluation logic 220 provides the second key to data evaluation logic 218.

It should be noted that, for purposes of the illustrated embodiment, each instance of data evaluation logic 218, 220 may be implemented at the producers 202, 204; at the consumers 206, 208; or at an intermediate node (not shown) which is separate and distinct from the producers 202, 204 and the consumers 206, 208. Further, in certain embodiments, the data evaluation logic 218, 220 may be implemented as one functional block in one particular location.

Once each of the instances of data evaluation logic 218, 220 has obtained both the first key and the second key, a comparison between the two keys is performed. In this embodiment, the first key is first stored in assigned location 214A of the key storage buffer 214, and the second key is stored in assigned location 216A of key storage buffer 216. The data evaluation logic 218, 220 then determines whether or not the first key and the second key are identical. If the keys are identical, then data evaluation logic 218 provides the first consumer 206 with the first key by moving the first key into assigned location 214B of the key storage buffer 214, which is the location at which the consumer 206 is anticipating the arrival of the key. The key is not visible to the consumer 206 until the data evaluation logic 218 transfers it to location 214B. Similarly, if the keys are identical, then data evaluation logic 220 provides the second consumer 208 with the second key by moving the second key into assigned location 216B of the key storage buffer 216, which is the location at which the consumer 208 is anticipating the arrival of the key. The key is not visible to the consumer 208 until the data evaluation logic 220 transfers it to location 216B.

As described previously, in certain embodiments, the first key includes location data for data buffer 210, where the first set of data has been stored. In some embodiments, however, the data evaluation logic 218, 220 uses the address of the key storage location as an indicator of a particular data buffer 210, 212 that is currently in use. For example, if there are 100 key storage locations on the left side (i.e., side "A") of key storage 214, 216, then the data evaluation logic 218, 220 can validate the key and forward it to the corresponding address in the consumers 206, 208 key storage memory window (i.e., side "B"). The arrival of the key into a given consumer's 206, 208 key storage address implicitly establishes which data buffer 210, 212 has been validated.

Returning to the example shown, by receiving the first key, the first consumer 206 is made aware that the first set of data from the data buffer 210 is ready for consumption. Similarly, for purposes of this embodiment, data evaluation logic 220 determines whether or not the first key and the second key are identical, and if the keys are identical, then data evaluation logic 220 provides the second consumer 208 with the second key. As described previously, the second key includes location data for data buffer 212, where the second set of data has been stored. By receiving the second key, the second consumer 208 has received (1) an indication of the validity of the second set of data (e.g., a validity "flag"), and (2) the retrieval location for the second set of data. When the validity indication, or validity flag, is received, the second consumer 208 becomes aware that the second set of data is a valid and trustworthy dataset. Additionally, when the validity indication is received, synchronization of the high-integrity data transfer system 200, including operation of the two producers 202, 204 and two consumers 206, 208, occurs.

In certain embodiments, the data evaluation logic 218, 220 compares the keys to determine whether they are identical and evaluates a timing condition to determine whether the keys were received within a predetermined window of time, prior to providing at least one of the keys to a consumer 206, 208. In this case, the data evaluation logic 218, 220 must determine whether two conditions are met, in order to provide an indication to a consumer 206, 208 that the set of data is valid. The first condition includes the identical nature of each of the keys, and the second condition includes receiving both of the keys simultaneously or within a predefined timeframe of one another.

Embodiment 1

Asynchronous Implementation

Figure 3:
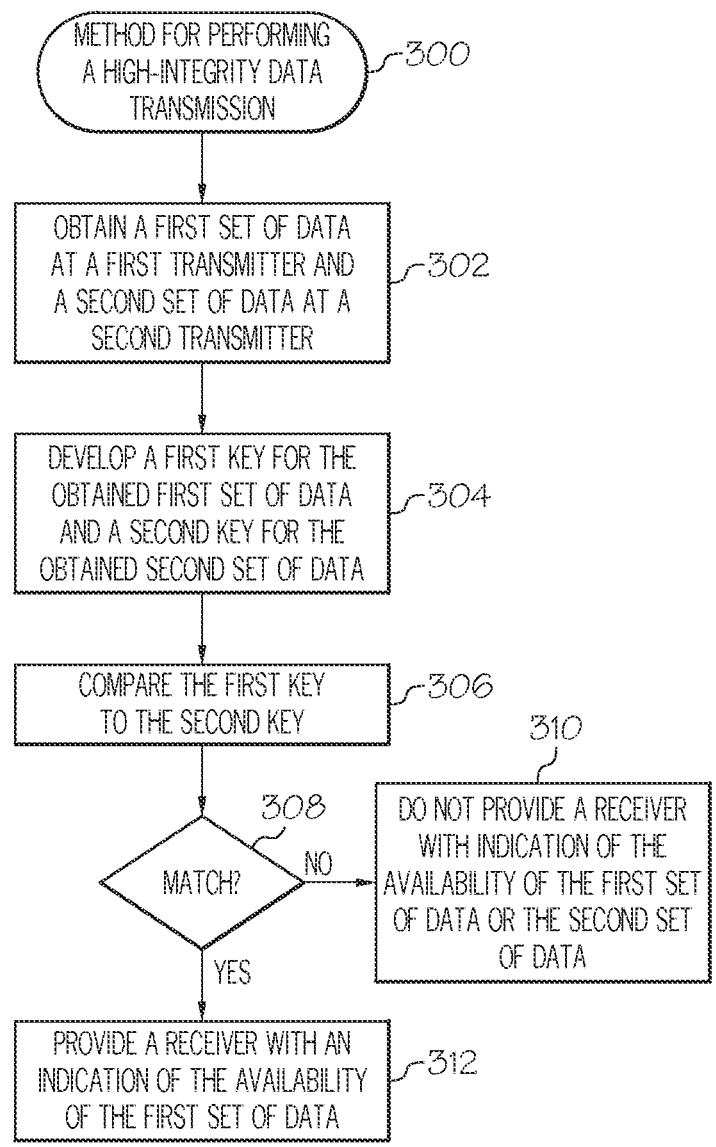
FIG. 3 is a flow chart that illustrates an embodiment of a process for performing a high-integrity data transmission.

FIG. 3 is a flow chart that illustrates an embodiment of a process 300 for performing a high-integrity data transmission. The various tasks performed in connection with process 300 may be performed by software, hardware, firmware, or any combination thereof. For illustrative purposes, the following description of process 300 may refer to elements mentioned above in connection with FIGS. 1-2. In practice, portions of process 300 may be performed by different elements of the described system, e.g., one or more producers and/or transmitters, one or more consumers and/or receivers, or intermediate components or nodes that are separate and distinct from either the producers or consumers. It should be appreciated that process 300 may include any number of additional or alternative tasks, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

For ease of description and clarity, the process 300 is assumed to begin by obtaining a first set of data at a first transmitter and a second set of data at a second transmitter (step 302). The first set of data and the second set of data should be identical, but are usually produced by separate and distinct elements or components of the computing system, for purposes of error-checking and verification. The first set of data and the second set of data are either produced or obtained as complete datasets (e.g., entire sets of data), by the first and second transmitters, respectively. The first and second transmitters may include any element or component of the computing system capable of generating or receiving a message, and transmitting (or re-transmitting) the message to a "consumer" or "receiver" element, to a storage location in memory, or other location in the computing system appropriate to the application. In certain embodiments, the transmitters are physically distinct and situated in different locations. In some embodiments, however, the transmitters may be implemented as a single producer which creates a dataset and key twice (e.g., temporal redundancy). In this case, the created datasets and associated keys are treated as if created by separate and distinct producers. However, the process 300 requires a large enough key time acceptance window to allow the execution of a second computation, unless the two keys are issued back to back inside a narrow time window.

Each set of data may include a communication appropriate to the computing environment and current application. For example, sets of data produced at a transmitter may include results of mathematical and/or logical operations performed by a transmitter, or data retrieved from a location in the computing environment. Sets of data received at a transmitter may include any type of readily-available information which does not require additional mathematical or logical operations or manipulation for purposes of changing the data in any way. In other words, datasets received at a transmitter is a "complete" dataset which requires no alteration prior to transmission. Such datasets may include sensor data, navigation data, control data, command data, response data, status data, feedback data, video data, audio data, and all forms of computational data such as constants, variables, formulas, intermediate and final results. In practice, all forms of information, for any purpose, may be reduced into a series of data messages (e.g., a dataset) to be transferred from a transmitter to a receiver.

Next, the process 300 develops a first key for the obtained first set of data and a second key for the obtained second set of data (step 304). The process 300 creates a key associated with a set of data by performing an integrity check and then aggregating certain characteristics of the data with the results of the integrity check to form the key. As described previously, the integrity check may include a cyclic redundancy check (CRC), a checksum, or other method of ensuring that the set of data has not been corrupted. Applicable characteristics which may be aggregated and incorporated into the key may include, without limitation: the size of the set of data; a pointer to the memory location at which the set of data has been stored; and/or identification of the producer/ transmitter, sensor, channel, or priority of the data message. Here, the process 300 performs the CRC and/or checksum using the first set of data to produce the first key, and using the second set of data to produce the second key. Additional characteristics used to create the key are directly associated with the applicable set of data and are obtained and incorporated into the key by the process 300. Generally, the contents of a set of data are not incorporated into the key associated with that set of data.

After developing both of the keys (step 304), the process 300 compares the first key to the second key (step 306) to determine whether there is a match (step 308). A "match" between the two keys shows that the first key is identical to the second key. Identical keys further indicate that the first set of data is identical to the second set of data, and that neither set of data has been corrupted and/or contains errors. When the two keys do not match, the process 300 concludes that an error has occurred, and that one or both of the datasets may be invalid. Thus, when the first key does not match the second key (the "No" branch of 308), the process 300 does not provide a receiver with any indication of the availability of the first set of data and/or the second set of data (step 310). Here, the process 300 does not provide retrieval information to the receiver, and the receiver is unaware of the existence of the corrupted, erroneous, or invalid dataset(s). This results in a type of preemptive "blocking", or prevention of a receiver obtaining bad data. When a receiver is unaware of the existence of an erroneous dataset, no data is received or retrieved by the receiver. In this case, the "denial" of an indication of the arrival of the corrupted data simply means that indication of new data is never provided to the receiver.

However, when the first key matches the second key (the "Yes" branch of 308), the process 300 provides a receiver with indication of the availability of the first set of data (step 312). In certain embodiments, the indication of availability is an indication only (e.g., a validity "flag" to alert a receiver/consumer of the availability of valid data). In some embodiments, however, the indication of availability is accompanied by a set of access information for the set of data. Here, the process 300 may provide access information to the receiver, indicating a storage location of the first set of data, at which the first set of data may be retrieved. Access information generally includes: a key (or an applicable subset of the information included in the key), a pointer to a memory location at which the data resides, or other indication of a storage location and/or parameters associated with the storage location of the first set of data.

The key is primarily used by the process 300 to determine whether the first set of data and the second set of data are identical, thereby indicating permissibility that either of the first and/or second sets of data is obtained by the receiver. However, the entire key or any subset of that information may be made available to one or more receivers. In a typical scenario, the most likely elements of a key passed to a receiver may include a pointer to the first byte of the first or second set of data and an indication of the length of the applicable set of data. The key may include fields that identify the producer or transmitter, sensor, channel, or priority of the data message. There is no upper limit to the complexity of the key, and may be at the discretion of the designer of the system. In certain embodiments taking a "minimalist" approach, a consumer/receiver could receive none of the key data, except for an indication (e.g., a signal) that a new valid key now exists. Upon assertion of the signal, the consumer goes to a predetermined memory address and reads a message with a predetermined format. In this minimal case, the process 300 uses the key information (CRC, length, time, etc.) to determine whether the first and second sets of data are identical, but the consumer does not use the key. Here, the consumer only needs to know that new and valid data is ready for consumption before moving forward with a separate and predetermined process.

Once access information is received, the receiver has the capability of retrieving the data from the memory location indicated by the access information. At this point, the receiver has determined that the first and second sets of data are identical and, as created by the producers/transmitters, comprise accurate, valid, and error-free data. This contributes to the high-integrity required by critical systems, as described previously.

Embodiment 2

Synchronous Implementation

Figure 4:
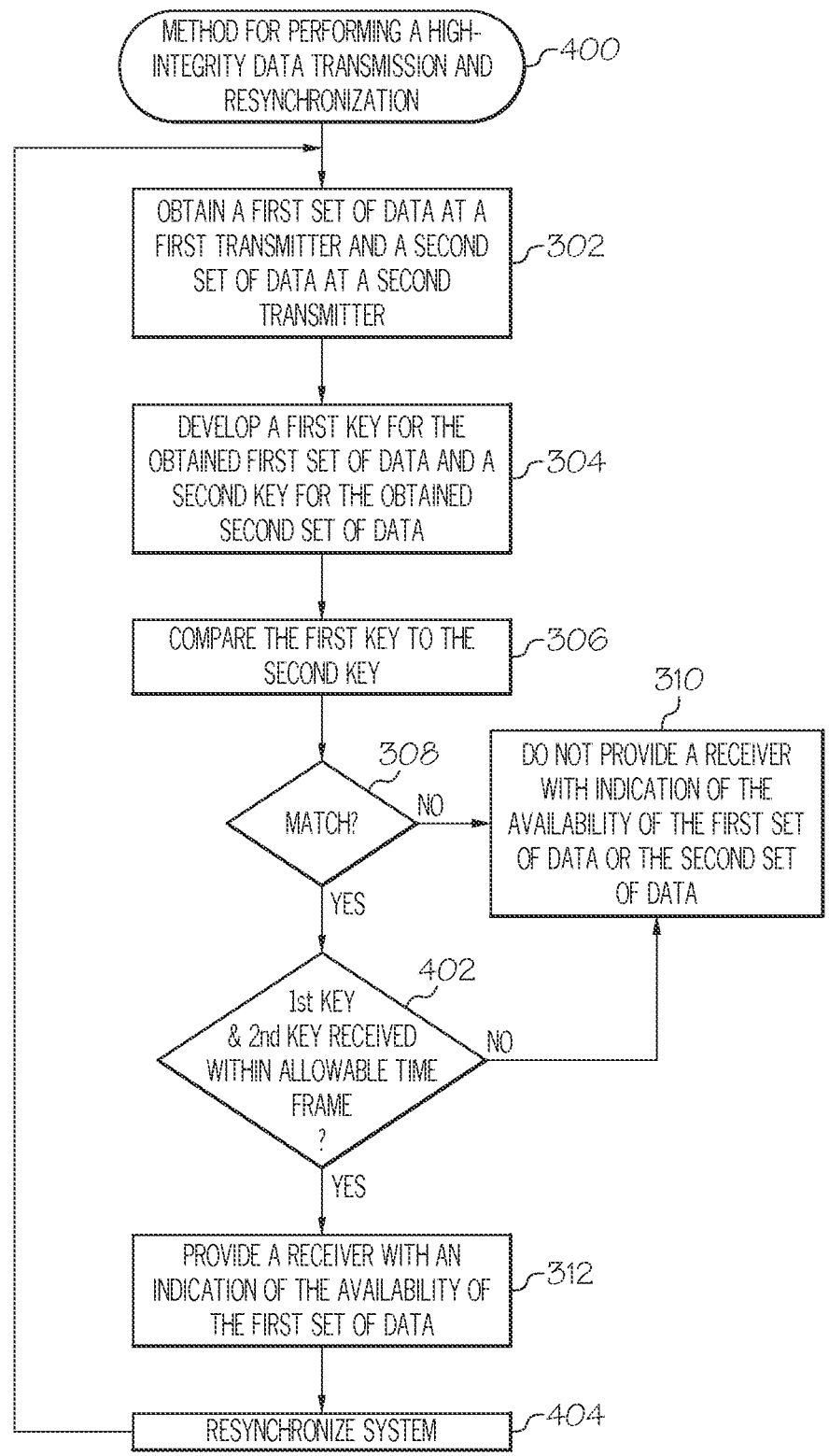
FIG. 4 is a flow chart that illustrates another embodiment of a process for performing a high-integrity data transmission, including resynchronization of the system.

FIG. 4 is a flow chart that illustrates another embodiment of a process 400 for performing a high-integrity data transmission, including resynchronization of the system. As shown, the process 400 incorporates the steps of the previously described process for performing a high-integrity data transmission (see reference 300 of FIG. 3), along with steps related to timing and resynchronization aspects of the process 400.

For this particular embodiment, when the process 400 determines that the first key and the second key are a match (the "Yes" branch of 308), the process 400 then determines whether the first key and the second key were received within an allowable time frame (step 402). An allowable time frame may comprise any predetermined window of time during which both the first key and the second key are received by the process 400. In some embodiments, the predetermined window of time includes timing values that are identical, indicating that the first key and the second key must be received simultaneously. In other embodiments, however, the predetermined window of time includes timing values that are not identical, and are separated by an allowable amount of error.

When the first key and the second key are not received within an allowable time frame (the "No" branch of 402), the process 400 does not provide a receiver with any indication of the availability of the first set of data or the second set of data (step 310), as described previously with regard to FIG. 3. When the first key and the second key are received within an allowable time frame (the "Yes" branch of 402), the process 400 provides a receiver with an indication of the availability of the first set of data (step 312), and then resynchronizes the system (step 404).

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium," "processor-readable medium," or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for performing high-integrity data transmission, the method comprising:
    obtaining a first set of data at a first transmitter and a second set of data at a second transmitter;
    developing a first key for the obtained first set of data and a second key for the obtained second set of data; and
    when the first key matches the second key, permitting one or more receivers to access at least one of the first set of data and the second set of data, by:
        passing a pointer to the first key to the one or more receivers, wherein the pointer references a first memory location of the first key, and wherein the first key comprises a memory location of the first set of data.

2. The method of claim 1, wherein the obtaining step further comprises:
    performing a mathematical calculation to create the first set of data and the second set of data.

3. The method of claim 1, wherein the obtaining step further comprises:
    receiving a first complete dataset at the first transmitter, wherein the first set of data comprises the first complete dataset; and
    receiving a second complete dataset at the second transmitter, the second set of data comprising the second complete dataset.

4. The method of claim 1, further comprising:
    storing the first set of data in a first buffer; and
    storing the second set of data in a second buffer;
    wherein the permitting step further comprises providing the one or more receivers with access information for at least one of the first buffer and the second buffer.

5. The method of claim 1, wherein the comparing step is performed at the first transmitter.

6. The method of claim 1, wherein the comparing step is performed by at least one of the one or more receivers.

7. The method of claim 1, wherein the comparing step is performed at an intermediate node; and
    wherein the intermediate node comprises a computing element separate and distinct from the first transmitter, the second transmitter, and the one or more receivers.

8. The method of claim 1, wherein, when a match between the first key and the second key has not been determined, denying the one or more receivers access to the first set of data and the second set of data.

9. The method of claim 8, wherein the denying step further comprises preventing the one or more receivers from accessing the first key and the second key.

10. A system for preventing error transmission in a computational environment, the system comprising:
    a plurality of transmitters, wherein a first one of the plurality of transmitters is configured to communicate a first set of data and a second one of the plurality of transmitters is configured to communicate a second set of data;
    at least one receiver, configured to obtain data from the plurality of transmitters; and
    processing logic, configured to:
        create a first key associated with the first set of data and a second key associated with the second set of data;
        compare the first key to the second key to determine whether the first key matches the second key; and
        transmit data retrieval details to the receiver when the first key matches the second key, wherein the data retrieval details facilitate access to the first set of data by the receiver;
    wherein the data retrieval details comprise a pointer to the first key, wherein the pointer references a first memory location of the first key, and wherein the first key comprises a memory location of the first set of data.

11. The system of claim 10, wherein each of the plurality of transmitters performs a mathematical calculation to create the first set of data and the second set of data.

12. The system of claim 10, wherein the first one of the plurality of transmitters is further configured to receive an entirety of the first set of data, prior to communicating the first set of data; and
    wherein the second one of the plurality of transmitters is further configured to receive an entirety of the second set of data, prior to communicating the second set of data.

13. A non-transitory, computer-readable medium containing instructions thereon, which, when executed by a processor, perform a method comprising:
    creating a first key using a first set of data and a second key using a second set of data, by:
        performing a first cyclic redundancy check (CRC), using the first set of data, to obtain a first result; and performing a second CRC, using the second set of data, to obtain a second result, wherein the first key comprises the first result, and the second key comprises the second result;

comparing the first key that uniquely characterizes the first set of data to the second key that uniquely characterizes the second set of data;

when the first key matches the second key, determining that the first set of data and the second set of data comprise valid datasets and providing access to the first set of data to a receiver; and when the first key does not match the second key, determining that the first set of data and the second set of data do not comprise valid datasets and preventing access to the first set of data by the receiver.

14. A non-transitory, computer-readable medium containing instructions thereon, which, when executed by a processor, perform a method comprising:

creating a first key using a first set of data and a second key using a second set of data, by:
performing a first checksum, using the first set of data, to obtain a first result; and
performing a second checksum, using the second set of data, to obtain a second result, wherein the first key comprises the first result, and the second key comprises the second result;

comparing the first key that uniquely characterizes the first set of data to the second key that uniquely characterizes the second set of data;

when the first key matches the second key, determining that the first set of data and the second set of data comprise valid datasets and providing access to the first set of data to a receiver; and when the first key does not match the second key, determining that the first set of data and the second set of data do not comprise valid datasets and preventing access to the first set of data by the receiver.

15. A method for performing high-integrity data transmission, the method comprising:

obtaining a first set of data at a first transmitter and a second set of data at a second transmitter;

developing a first key for the obtained first set of data and a second key for the obtained second set of data;

storing the first key and the second key within a predetermined window of time, wherein the first key is stored at a first timing value and the second key is stored at a second timing value, wherein the first timing value and the second timing value are separated by an allowable amount of timing error, and wherein the predetermined window of time includes the first timing value, the second timing value, and the allowable amount of timing error; and when the first key matches the second key,
providing a receiver indication of validity of the first set of data, by:
passing a pointer to the first key to the receiver, wherein the pointer references a first memory location of the first key, and wherein the first key comprises a memory location of the first set of data; and
synchronizing operation of the first transmitter and the second transmitter.

16. The method of claim 15, wherein the obtaining step further comprises creating the first set of data and the second set of data.

17. The method of claim 15, wherein the obtaining step further comprises:

receiving a first complete dataset at the first transmitter, wherein the first set of data comprises the first complete dataset; and receiving a second complete dataset at the second transmitter, the second set of data comprising the second complete dataset.

18. The method of claim 15, further comprising:
storing the first set of data in a first buffer; and
storing the second set of data in a second buffer;
wherein the permitting step further comprises providing the receiver with access information for the first buffer and the second buffer.

19. The method of claim 15, wherein the comparing step is performed at the first transmitter.

20. The method of claim 15, wherein the comparing step is performed at the receiver.

21. The method of claim 15, wherein the comparing step is performed at an intermediate node; and
wherein the intermediate node comprises a computing element separate and distinct from the first transmitter, the second transmitter, and the receiver.

22. The method of claim 15, wherein, when a match between the first key and the second key has not been determined, providing no indication of validity to the receiver.

23. The method of claim 22, wherein, when a match between the first key and the second key has not been determined,
providing no indication of validity to the receiver; and
performing no synchronization of the first transmitter and the second transmitter.

24. A system for preventing error transmission in a computational environment, the system comprising:

a plurality of transmitters, wherein a first one of the plurality of transmitters is configured to communicate a first set of data and a second one of the plurality of transmitters is configured to communicate a second set of data;

at least one receiver, configured to obtain data from the plurality of transmitters; and processing logic, configured to:
create a first key associated with the first set of data and a second key associated with the second set of data;
determine whether a timing condition has been satisfied, by:
detect a first timing value associated with recognition of the first set of data, and a second timing value associated with recognition of the second set of data; and
compare the first timing value to the second timing value to determine whether the timing condition has been satisfied, wherein the timing condition comprises recognizing the first timing value and the second timing value within a predetermined timing window;
compare the first key to the second key to determine whether the first key matches the second key; and
when the first key matches the second key, and the timing condition has been satisfied,
transmit data retrieval details to the receiver, wherein the data retrieval details facilitate access to the first set of data by the receiver; and
synchronize operation of the plurality of transmitters and the at least one receiver.

25. The system of claim 24,
wherein the timing condition comprises identical values for the first timing value and the second timing value, and wherein the predetermined timing window comprises a simultaneous occurrence of the recognition of the first set of data and the recognition of the second set of data.

26. The system of claim 24, wherein the data retrieval details comprise the first key, wherein the first key comprises a memory location of the first set of data.

27. The system of claim 24, wherein the data retrieval details comprise a pointer to the first key, wherein the pointer references a first memory location of the first key, and wherein the first key comprises a memory location of the first set of data.

* * * * *